(12) United States Patent
Cole et al.

(10) Patent No.: US 12,166,919 B2
(45) Date of Patent: *Dec. 10, 2024

(54) TOOL FOR ANNOTATING AND REVIEWING AUDIO CONVERSATIONS

(71) Applicant: Twilio Inc., San Francisco, CA (US)

(72) Inventors: Tyler Cole, Diamond Bar, CA (US); Eduardo Pardo San Llorente, Madrid (ES); Sahil Kumar, San Francisco, CA (US); Byeongung Ahn, East Palo Alto, CA (US); Elaine Lee, Fremont, CA (US); Nicolas Acosta Amador, San Francisco, CA (US); Pablo Pérez Diez, Madrid (ES)

(73) Assignee: Twilio Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/448,675

(22) Filed: Aug. 11, 2023

(65) Prior Publication Data

US 2023/0388413 A1 Nov. 30, 2023

Related U.S. Application Data

(63) Continuation of application No. 17/447,039, filed on Sep. 7, 2021, now Pat. No. 11,765,267.
(Continued)

(51) Int. Cl.
*H04M 3/42* (2006.01)
*G06F 40/169* (2020.01)
(Continued)

(52) U.S. Cl.
CPC ...... *H04M 3/42221* (2013.01); *G06F 40/279* (2020.01); *G06N 20/00* (2019.01);
(Continued)

(58) Field of Classification Search
CPC .......... H04M 3/42221; H04M 3/5141; H04M 3/5175; H04M 2201/40; H04M 2201/42;
(Continued)

(56) References Cited

U.S. PATENT DOCUMENTS 3,568,155 A * 3/1971 Abraham ............ G06F 16/9014
5,384,703 A 1/1995 Withgott et al.
(Continued)

FOREIGN PATENT DOCUMENTS

WO 2022086939 4/2022

OTHER PUBLICATIONS

"U.S. Appl. No. 17/303,279, Notice of Allowance mailed Aug. 24, 2023", 11 pgs.
(Continued)

*Primary Examiner* — Lisa Hashem
(74) *Attorney, Agent, or Firm* — Schwegman Lundberg & Woessner, P.A.

(57) ABSTRACT

Methods, systems, and computer programs are presented for searching and labeling the content of voice conversations. An Engagement Intelligence Platform (EIP) analyzes conversation transcripts to find states and information for each of the states (e.g., interest rate quoted and value of the interest rate). An annotator User Interface (IU) is provided for performing queries, such as, "Find calls were the agent asked the customer for their name and the customer did not answer;" "Find calls where the customer objected after the interest rate for the loan was quoted, "Find calls where the agent asked for consent for recording the call, but no customer confirmation was received." The EIP analyzes the conversation and labels (e.g., "tags") the text where the conversation associated with the label took place, such as,
(Continued)

"An interest rate was provided." The labels are customizable, so each client can define its own labels based on business needs.

20 Claims, 16 Drawing Sheets

Related U.S. Application Data

(60) Provisional application No. 63/133,070, filed on Dec. 31, 2020.

(51) Int. Cl.
| | |
|---|---|
| *G06F 40/279* | (2020.01) |
| *G06F 40/30* | (2020.01) |
| *G06N 20/00* | (2019.01) |
| *G10L 15/26* | (2006.01) |
| *H04M 3/51* | (2006.01) |

(52) U.S. Cl.
CPC .......... *G10L 15/26* (2013.01); *H04M 3/5141* (2013.01); *H04M 3/5175* (2013.01); *G06F 40/169* (2020.01); *G06F 40/30* (2020.01); *H04M 2201/40* (2013.01); *H04M 2201/42* (2013.01); *H04M 2203/301* (2013.01); *H04M 2203/552* (2013.01)

(58) Field of Classification Search
CPC ...... H04M 2203/301; H04M 2203/552; G06F 40/279; G06F 40/169; G06F 40/30; G06N 20/00; G10L 15/26
See application file for complete search history.

(56) References Cited

U.S. PATENT DOCUMENTS

| | | | | |
|---|---|---|---|---|
| 5,945,933 | A * | 8/1999 | Kalkstein ................ | H03M 7/40 341/63 |
| 6,138,139 | A * | 10/2000 | Beck ..................... | G06Q 10/06 705/28 |
| 6,567,805 | B1 * | 5/2003 | Johnson .................. | G06F 16/30 707/999.005 |
| 7,702,508 | B2 * | 4/2010 | Bennett ............. | G06F 16/24522 704/270.1 |
| 7,725,321 | B2 * | 5/2010 | Bennett ................. | G06F 40/216 704/270.1 |
| 7,801,910 | B2 * | 9/2010 | Houh ................... | G06F 16/583 707/765 |
| 8,428,227 | B2 * | 4/2013 | Angel .................... | G10L 15/26 379/88.25 |
| 8,494,133 | B2 * | 7/2013 | Jeffs ..................... | H04M 15/58 379/265.03 |
| 8,775,165 | B1 * | 7/2014 | Oikawa ................. | G06F 40/169 704/10 |
| 8,798,242 | B1 * | 8/2014 | Sankaranarayanan .. | H04M 3/51 379/265.03 |
| 8,942,359 | B2 * | 1/2015 | Seetharaman .... | H04M 3/53333 379/88.13 |
| 8,983,975 | B2 * | 3/2015 | Kenton ................. | G06Q 30/00 706/14 |
| 9,880,807 | B1 * | 1/2018 | Haggerty ................ | G06F 3/167 |
| 9,910,909 | B2 * | 3/2018 | Hegde ................ | G06Q 30/0201 |
| 9,965,726 | B1 | 5/2018 | Tablan et al. | |
| 10,089,639 | B2 * | 10/2018 | Kannan ............. | G06Q 30/0201 |
| 10,388,272 | B1 | 8/2019 | Thomson et al. | |
| 10,453,455 | B2 * | 10/2019 | Manuvinakurike ..... | G06F 3/167 |
| 10,467,339 | B1 | 11/2019 | Shen | |
| 10,839,335 | B2 * | 11/2020 | Weisman ............... | G06N 20/00 |
| 11,165,900 | B2 * | 11/2021 | Sachdev .............. | H04M 1/656 |
| 11,170,154 | B1 | 11/2021 | Van Dyke et al. | |
| 11,170,175 | B1 | 11/2021 | Kohli et al. | |
| 11,475,210 | B2 | 10/2022 | de Oliveira et al. | |
| 11,568,231 | B2 * | 1/2023 | Meteer .................... | G06F 40/30 |
| 11,765,267 | B2 | 9/2023 | Cole et al. | |
| 11,809,804 | B2 | 11/2023 | Láinez Rodrigo et al. | |
| 11,848,025 | B2 * | 12/2023 | Proença .................. | G10L 15/26 |
| 11,941,348 | B2 | 3/2024 | de Oliveira et al. | |
| 11,947,872 | B1 * | 4/2024 | Mahler-Haug ......... | G06Q 10/10 |
| 2002/0046018 | A1 | 4/2002 | Marcu | |
| 2007/0133437 | A1 * | 6/2007 | Wengrovitz ............ | H04M 3/56 704/E15.045 |
| 2009/0030894 | A1 | 1/2009 | Mamou et al. | |
| 2010/0104086 | A1 | 4/2010 | Park | |
| 2010/0332477 | A1 | 12/2010 | Jeffs et al. | |
| 2013/0007037 | A1 | 1/2013 | Azzam et al. | |
| 2014/0169547 | A1 | 6/2014 | Murgai | |
| 2015/0032448 | A1 | 1/2015 | Wasserblat et al. | |
| 2015/0046783 | A1 * | 2/2015 | O'Donoghue ........ | G06F 40/169 715/205 |
| 2015/0106091 | A1 | 4/2015 | Wetjen et al. | |
| 2015/0181020 | A1 | 6/2015 | Fitzsimmons et al. | |
| 2015/0256677 | A1 * | 9/2015 | Konig ................. | H04M 3/5191 379/265.09 |
| 2016/0092792 | A1 | 3/2016 | Chandrasekaran et al. | |
| 2018/0113854 | A1 | 4/2018 | Vig et al. | |
| 2018/0143956 | A1 | 5/2018 | Skarbovsky et al. | |
| 2018/0332165 | A1 | 11/2018 | Cunningham et al. | |
| 2019/0121852 | A1 | 4/2019 | Applegate et al. | |
| 2019/0392837 | A1 | 12/2019 | Jung et al. | |
| 2020/0279017 | A1 | 9/2020 | Norton et al. | |
| 2021/0158805 | A1 | 5/2021 | Sivasubramanian et al. | |
| 2021/0335367 | A1 | 10/2021 | Graff et al. | |
| 2022/0067269 | A1 | 3/2022 | de Oliveira et al. | |
| 2022/0121884 | A1 * | 4/2022 | Zadeh ..................... | G06N 3/043 |
| 2022/0156296 | A1 * | 5/2022 | De Oliveira ............ | G10L 15/26 |
| 2022/0156460 | A1 * | 5/2022 | Láinez Rodrigo ..... | G06Q 30/02 |
| 2022/0210268 | A1 | 6/2022 | Cole et al. | |
| 2022/0261631 | A1 | 8/2022 | Cohen et al. | |
| 2022/0382959 | A1 | 12/2022 | Láinez Rodrigo et al. | |
| 2022/0414319 | A1 | 12/2022 | de Oliveira et al. | |
| 2024/0020458 | A1 | 1/2024 | Láinez Rodrigo et al. | |
| 2024/0037418 | A1 * | 2/2024 | Durairaj ................. | G06N 5/022 |
| 2024/0152689 | A1 | 5/2024 | de Oliveira et al. | |

OTHER PUBLICATIONS

"U.S. Appl. No. 17/939, 176, Response filed Sep. 14, 2023 to Non Final Office Action mailed Jun. 15, 2023", 8 pgs.

"U.S. Appl. No. 17/305,976, Non Final Office Action mailed Sep. 21, 2023", 17 pgs.

"U.S. Appl. No. 17/939,176, Notice of Allowance mailed Nov. 8, 2023", 8 pgs.

Efstathiou, "Semantic Source Code Models Using Identifier Embeddings", IEEE ACM 16th International Conference on Mining Software Repositories (MSR), (2019), 29-33.

U.S. Appl. No. 18/410,621, filed Jan. 11, 2024, Language Model for Abstractive Summarization.

U.S. Appl. No. 18/400,529, filed Dec. 29, 2023, Capturing Output of Language Operator-Based Communication Analysis.

"U.S. Appl. No. 17 449,405, Non Final Office Action mailed Nov. 27, 2023", 12 pgs.

"U.S. Appl. No. 17/305,976, Examiner Interview Summary mailed Dec. 12, 2023", 2 pgs.

"U.S. Appl. No. 17/305,976, Response filed Dec. 14, 2023 to Non Final Office Action mailed Sep. 21, 2023", 13 pgs.

"U.S. Appl. No. 17/305,976, Final Office Action mailed Jan. 9, 2024", 19 pgs.

"U.S. Appl. No. 17/449,405, Examiner Interview Summary mailed Jan. 24, 2024", 2 pgs.

"Application Serial No. 17/939, 176, Supplemental Notice of Allowability mailed Feb. 21, 2024", 3 pgs.

"U.S. Appl. No. 17/305,976, Non Final Office Action mailed Mar. 26, 2024", 18 pgs.

"U.S. Appl. No. 17/305,976, Response filed Mar. 6, 2024 to Final Office Action mailed Jan. 9, 2024", 13 pgs.

"U.S. Appl. No. 17/449,405, Notice of Allowance mailed Apr. 29, 2024", 15 pgs.

(56) References Cited

OTHER PUBLICATIONS

"U.S. Appl. No. 17/449,405, Response filed Feb. 27, 2024 to Non Final Office Action mailed Nov. 27, 2023", 12 pgs.
"U.S. Appl. No. 17/304,081, Notice of Allowability mailed Jul. 20, 2022", 2 pgs.
"U.S. Appl. No. 17/304,081, Notice of Allowance mailed Jun. 9, 2022", 9 pgs.
"U.S. Appl. No. 17/447,039, Examiner Interview Summary mailed Nov. 7, 2022", 2 pgs.
"U.S. Appl. No. 17/447,039, Final Office Action mailed Feb. 21, 2023", 11 pgs.
"U.S. Appl. No. 17/447,039, Non Final Office Action mailed Aug. 16, 2022", 10 pgs.
"U.S. Appl. No. 17/447,039, Notice of Allowance mailed May 12, 2023", 11 pgs.
"U.S. Appl. No. 17/447,039, Response filed Apr. 21, 2023 to Final Office Action mailed Feb. 21, 2023", 11 pgs.
"U.S. Appl. No. 17/447,039, Response filed Nov. 16, 2022 to Non Final Office Action mailed Aug. 16, 2022", 11 pgs.
"U.S. Appl. No. 17/939,176, Non Final Office Action mailed Jun. 15, 2023", 8 pgs.
Ba, Jimmy Lei, et al., "Layer Normalization", arXiv preprint, arXiv:1607.06450v1 [stat.ML], (Jul. 21, 2016), 14 pgs.
Celikyilmaz, Asli, et al., "Deep Communicating Agents for Abstractive Summarization", arXiv preprint, arXiv:1803.10357v3 [cs.CL], (Aug. 15, 2018), 14 pgs.
Chopra, Sumit, et al., "Abstractive Sentence Summarization with Attentive Recurrent Neural Networks", Proceedings of the NAACL-HLT16, (2016), 93-98.
Dai, et al., "Semi-supervised Sequence Learning", arXiv preprint, arXiv:1511.01432 [cs.LG], (Nov. 4, 2015), 10 pgs.
Devlin, Jacob, et al., "BERT: Pre-training of Deep Bidirectional Transformers for Language Understanding", arXiv preprint, arXiv:1810.04805 [cs.CL], (2018), 14 pgs.
Gehrmann, Sebastian, et al., "Bottom-Up Abstractive Summarization", arXiv preprint, arXiv:1808.10792v2 [cs.CL], (Oct. 9, 2018), 12 pgs.
Gu, Jiatao, et al., "Incorporating Copying Mechanism in Sequence-to-Sequence Learning", arXiv preprint, arXiv:1603.06393v3 [cs.CL], (Jun. 8, 2016), 10 pgs.
Holtzman, Ari, et al., "The Curious Case of Neural Text Degeneration", 8th International Conference on Learning Representations (ICLR), (Apr. 2020), 16 pgs.
Howard, Jeremy, et al., "Universal Language Model Fine-tuning for Text Classification", arXiv preprint, arXiv:1801.06146v5 [cs.CL], (May 23, 2018), 12 pgs.
Kingma, Diederik P, et al., "Adam: A Method for Stochastic Optimization", arXiv preprint, arXiv:1412.6980v9 [cs.LG], (Jan. 30, 2017), 15 pgs.
Kudo, Taku, et al., "SentencePiece: A simple and language independent subword tokenizer and detokenizer for Neural Text Processing", arXiv preprint, arXiv:1808.06226v1 [cs.CL], (Aug. 19, 2018), 6 pgs.
Li, Piji, et al., "Actor-Critic based Training Framework for Abstractive Summarization", arXiv preprint, arXiv:1803.11070v2 [cs.CL], (Aug. 15, 2018), 10 pgs.
Lin, Chin-Yew, "Rouge: A Package for Automatic Evaluation of Summaries", Text Summarization Branches Out: Proceedings of the ACL-04 Workshop, Barcelona, Spain., (2004), 8 pgs.

Liu, Peter J, et al., "Generating Wikipedia by Summarizing Long Sequences", arXiv preprint, arXiv:1801.10198v1 [cs.CL], (Jan. 30, 2018), 18 pgs.
Lloret, Elena, et al., "The Challenging Task of Summary Evaluation: An Overview", Author preprint, Language Resources and Evaluation, 52:1, 101-148, (2017), 54 pages.
Nallapati, Ramesh, et al., "Abstractive Text Summarization using Sequence-to-sequence RNNs and", arXiv preprint, arXiv:1602.06023v5 [cs.CL], (Aug. 26, 2016), 12 pgs.
Narayan, Shashi, et al., "Don't Give Me the Details, Just the Summary.", arxiv prepint, arixiv 1808.08745v1 cs.cl, (Aug. 27, 2018), 11 pages.
Paulus, Romain, et al., "A Deep Reinforced Model for Abstractive Summarization", arXiv:1705.04304v3 [cs.CL], (Nov. 13, 2017), 12 pgs.
Peters, Matthew, et al., "Deep contextualized word representations", Proceedings of the 2018 Conference of the North American Chapter of the Association for Computational Linguistics: Human Language Technologies, vol. 1 Long Papers, (2018), 11 pgs.
Radford, Alec, et al., "Improving Language Understanding Generative Pre-Training", author preprint, (2018), 12 pgs.
Radford, Alec, et al., "Language Models are Unsupervised Multitask Learners", author preprint, (2018), 24 pgs.
Rush, Alexander M, et al., "A Neural Attention Model for Abstractive Sentence Summarization", arXiv preprint, arXiv:1509.00685v2 [cs.CL], (Sep. 3, 2015), 11 pgs.
Schluter, Natalie, "The limits of automatic summarisation according to ROUGE", Proceedings of the 15th Conference of the European Chapter of the Association for Computational Linguistics: vol. 2, Short Papers, (Apr. 3-7, 2017), 5 pgs.
See, Abigail, et al., "Get To The Point: Summarization with Pointer-Generator Networks", arXiv preprint, arXiv:1704.04368v2 [cs.CL], (Apr. 25, 2017), 20 pgs.
Sennrich, Rico, et al., "Neural Machine Translation of Rare Words with Subword Units", arXiv preprint, arXiv:1508.07909v5 [cs.CL], (Jun. 10, 2016), 11 pgs.
Sutskever, Ilya, et al., "Sequence to Sequence Learning with Neural Networks", Part of Advances in Neural Information Processing Systems 27 (NIPS 2014), (Dec. 14, 2014), 19 pgs.
Tu, Zhaopeng, et al., "Modeling Coverage for Neural Machine Translation", arXiv preprint, arXiv:1601.04811v6 [cs.CL], (Aug. 6, 2016), 11 pgs.
Vaswani, Ashish, et al., "Attention is All You Need", 31st Conference on Neural Information Processing Systems (NIPS), arXiv:1706.03762v5 [cs.CL], (Dec. 6, 2017), 15 pgs.
Vinyals, Oriol, et al., "Pointer Networks", arXiv preprint, arXiv:1506.03134v2 [stat.ML], (Jan. 2, 2017), 9 pgs.
Wu, Yonghui, et al., "Googles Neural Machine Translation System: Bridging the Gap between Human and Machine Translation", arXiv preprint, arXiv:1609.08144v2 cs.CL, (Oct. 8, 2016), 23 pgs.
Zeng, Wenyuan, et al., "Efficient Summarization with Read-Again and Copy Mechanism", arXiv preprint, arXiv:1611.03382v1 [cs.CL], (Nov. 10, 2016), 11 pgs.
"U.S. Appl. No. 18/373,450, Non Final Office Action mailed Jun. 17, 2024", 19 pgs.
"U.S. Appl. No. 17/305,976, Response filed Jun. 25, 2024 to Non Final Office Action mailed Mar. 26, 2024", 10 pgs.

\* cited by examiner

400

0:01:37 / 0:16:20    ↶ △ ℃    -1.0X + 🔅

SID: GT9BB1C024I2A582D266I5CD729EBD2287

FIND KEYWORDS AND PHRASES  | Q |    GUIDELINES  ⚙

CHECKLIST
ANNOTATIONS
NAMEAGENT  X1  2
NOTICENUM   X2  0
RECORDING   X3  1
DEPENDENTS  X4  0
PROFANITY.  X5  0

1 OF THE LEADING LIFE INSURANCE SERVICES IN AMERICA AND HELP OVER 10000 PEOPLE EACH MONTH ON THE RIGHT POLICY. I [INAUDIBLE] PERSONALIZED PLAN. THE MESSAGES. YOU NEED SOME BUDGET. AS I SAID, MY NAME IS BRITTNEY, I'M A SENIOR LICENSE AGENT THAT SPECIALIZES IN YOUR AREA, AND MY JOB IS JUST BE YOUR ADVOCATING GUIDE. YOU TO THE RIGHT PLAN BASICALLY NEEDS FOR LIFE INSURANCE NOW, ARE YOU LOOKING AT RATES FOR YOURSELF? OR DID YOU NEED COVERAGE FOR OTHERS AND YOUR FAMILY AS WELL?
  NAME AGENT

NOTICE NUMBER
| VAB00000000  ⊖ |
CALL OUTCOME
| SELECT OUTCOME ˅ |
CALL SENTIMENT
| SELECT SENTIMENT ˅ |

| COMPLETE |

CUSTOMER | YES. MYSELF.
0:01:26

AGENT | OKAY, AND LET ME SEE HERE. ARE YOU CURRENTLY EMPLOYED? RETIRED ON SOCIAL SECURITY
0:01:28 | DISABILITY?

CUSTOMER | OH GOD [INAUDIBLE] QUESTIONS AGAIN. I ALREADY ANSWERED THEM TWICE.
0:01:36

AGENT | OKAY, DID YOU ALREADY?
0:01:41

CUSTOMER | I'M RETIRED.
0:01:42

AGENT | OKAY, I'M SORRY ABOUT THAT. OR DID YOU ALREADY SPEAK WITH SOMEBODY?
0:01:44

CUSTOMER | WELL, 1 PERSON CALL ME IN THE MIDDLE OF ME FILLING OUT THE APPLICATION ONLINE. I COULDNT
0:01:46 | FINISH THAT. THEN SHE TOOK ALL THE INFORMATION. THEN SHE TRANSFER IT TO SOMEBODY ELSE. AFTER

| FIND KEYWORDS AND PHRASES | 🔍 | | GUIDELINES | ⚙ |

| | | CHECKLIST ANNOTATIONS |
|---|---|---|
| CUSTOMER 0:01:26 | 1 OF THE LEADING LIFE INSURANCE SERVICES IN AMERICA AND HELP OVER 10000 PEOPLE EACH MONTH ON THE RIGHT POLICY. I [INAUDIBLE] PERSONALIZED PLAN. THE MESSAGES. YOU NEED SOME BUDGET. AS I SAID, MY NAME IS NAME_AGENT BRITTNEY I'M A SENIOR LICENSE AGENT THAT SPECIALIZES IN YOUR AREA, AND MY JOB IS JUST BE YOUR ADVOCATING GUIDE. YOU TO THE RIGHT PLAN BASICALLY NEEDS FOR LIFE INSURANCE. NOW, ARE YOU LOOKING AT RATES FOR YOURSELF? OR DID YOU NEED COVERAGE FOR OTHERS AND YOUR FAMILY AS WELL? | NAMEAGENT X1   2 NOTICENUM X2   0 RECORDING X3   1 DEPENDENTS X4   0 PROFANITY X5   0 |
| AGENT 0:01:36 | YES. MYSELF. | NOTICE NUMBER VAB00000000 ⊖ |
| AGENT 0:01:38 | OKAY. AND LET ME SEE HERE. ARE YOU CURRENTLY EMPLOYED? RETIRED ON SOCIAL SECURITY DISABILITY? | CALL OUTCOME SELECT OUTCOME ∨ |
| CUSTOMER 0:01:39 | OH GOD [INAUDIBLE] QUESTIONS AGAIN. I ALREADY ANSWERED THEM TWICE. | CALL SENTIMENT  702 POSITIVE NEUTRAL ✓ NEGATIVE |
| AGENT 0:01:41 | OKAY. DID YOU ALREADY? | |
| CUSTOMER 0:01:42 | I'M RETIRED. | COMPLETE |
| AGENT 0:01:44 | OKAY, I'M SORRY ABOUT THAT. OR DID YOU ALREADY SPEAK WITH SOMEBODY? | |
| CUSTOMER 0:01:46 | WELL, 1 PERSON CALL ME IN THE MIDDLE OF ME FILLING OUT THE APPLICATION ONLINE. I COULDN'T FINISH THAT. THEN SHE TOOK ALL THE INFORMATION. THEN SHE TRANSFER IT TO SOMEBODY ELSE. AFTER SHE MADE ME WAIT, AND THEN THE SECOND 1 TOOK THE INFORMATION AGAIN AND SHE MADE ME | |

FIG. 9

```
>/
38    },
39    form: {
40      {
41        id: "CallOutcome",
42        type: FormGroupEnum.SELECT,
43        label: "call-outcome",
44        items: {
45          {
46            type: FormGroupItemEnum.OPTION,
47            id: "NoAnswer",
48            name: "call-outcome",
49            value: "",
50            label: "Select outcome",
51          },
52          {
53            type: FormGroupItemEnum.OPTION,
54            id: "DoNotMail",
55            name: "call-outcome",
56            value: "DoNotMail",
57            label: "Do Not Mail",
58          },
59          {
60            type: FormGroupItemEnum.OPTION,
61            id: "LeftMessage",
62            name: "call-outcome",
63            value: "LeftMessage",
64            label: "Left Message",
65          },
66          {
67            type: FormGroupItemEnum.OPTION,
68            id: "NotInterested",
69            name: "call-outcome",
70            value: "NotInterested",
71            label: "Not Interested",
72          },
73          {
74            type: FormGroupItemEnum.OPTION,
75            id: "NotQualified",
76            name: "call-outcome",
77            value: "NotQualified",
78            label: "Not Qualified",
79          },
80          {
81            type: FormGroupItemEnum.OPTION,
82            id: "DidNotRunCredit",
83            name: "call-outcome",
84            value: "DidNotRunCredit",
85            label: "Did Not Run Credit",
86          },
87        },
```

FIG. 10

TOOL FOR ANNOTATING AND REVIEWING AUDIO CONVERSATIONS

CROSS-REFERENCE TO RELATED APPLICATIONS

This application is a continuation of U.S. patent application Ser. No. 17/447,039, filed Sep. 7, 2021, which claims the benefit of U.S. Provisional Patent Application No. 63/133,070, filed Dec. 31, 2020, which are incorporated by reference herein in their entirety.

TECHNICAL FIELD

The subject matter disclosed herein generally relates to methods, systems, and machine-readable storage media for techniques to search and analyze audio conversations.

BACKGROUND

Contact centers have operators that provide support to clients, sometimes via voice or video conversations that may be recorded for future use, such as to improve quality or determine if something went wrong during the conversation. Often, the audio of the conversations is transcribed to text so text searches may be performed.

However, some contact centers may record thousands of conversations a day, so trying to perform searches on the conversations is tedious and time-consuming. Further, finding the right conversations may be difficult since straight text searches may not be useful to find an item, such as, "Did the customer become unhappy during the conversation?" or "Did the agent provide her name?"

Some companies have reviewers that spend time listening to the conversations, but this process is expensive, prone to errors, and typically limited to a small subset of all the available conversations.

What is needed are flexible tools that can analyze conversations and enable users to provide feedback on the content of the conversation.

BRIEF DESCRIPTION OF THE DRAWINGS

Various of the appended drawings merely illustrate example embodiments of the present disclosure and cannot be considered as limiting its scope.

FIG. 4 is an image of a user interface (UI) that includes options for tagging sections of the conversation, according to some example embodiments.

FIG. 7 is an image showing the use of the option for configuring the call sentiment of the conversation, according to some example embodiments.

FIG. 9 is an image of the UI showing options associated with providing information about a call to a user, according to some example embodiments.

FIG. 10 illustrates part of an example configuration for the annotator, according to some example embodiments.

DETAILED DESCRIPTION

Figure 1:
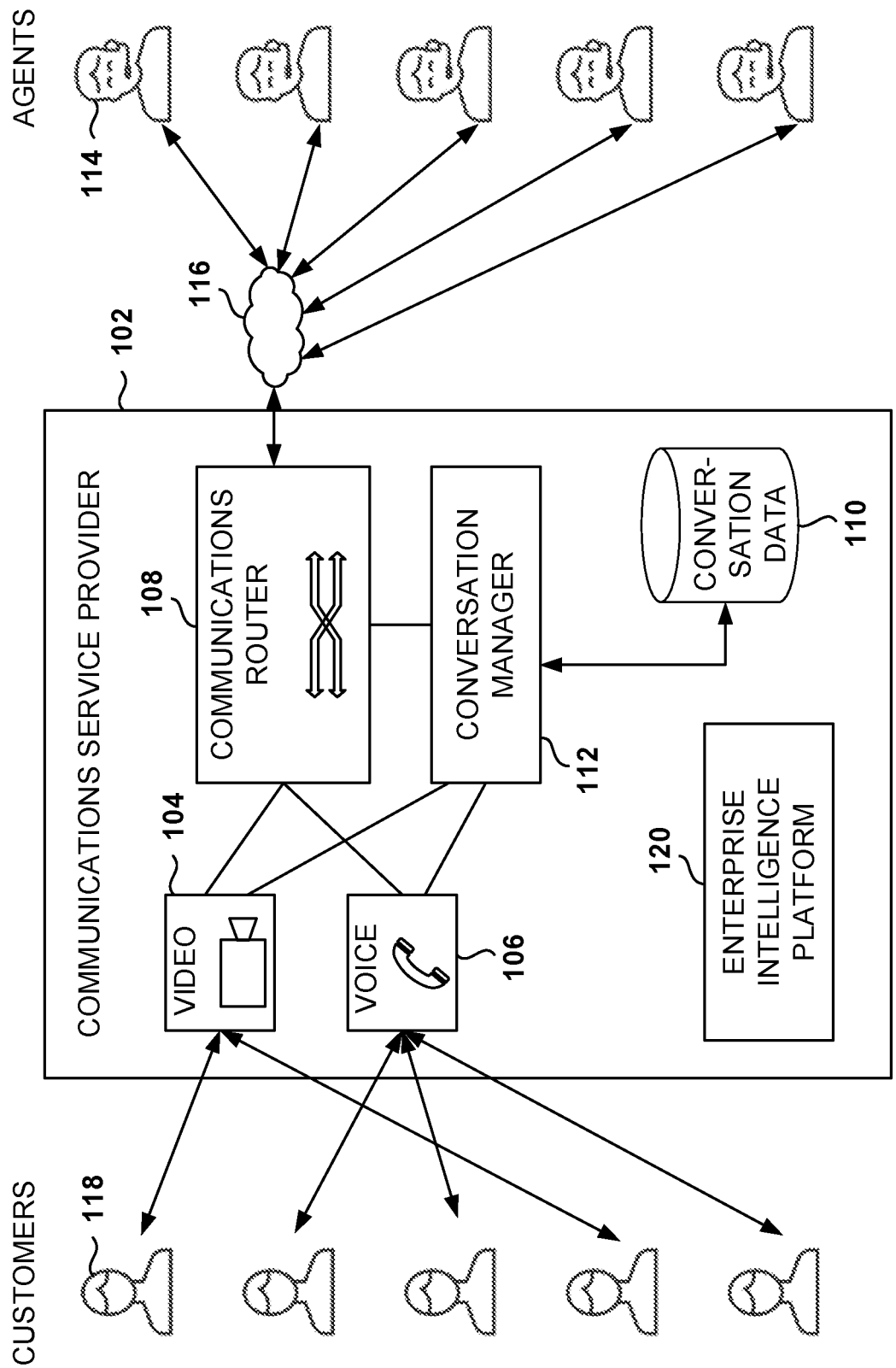
FIG. 1 is a representative diagram showing an architecture of a communications service provider that provides call center services, according to some example embodiments.

Example methods, systems, and computer programs are directed to a flexible search tool for analyzing, tagging, and searching audio conversations. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An Engagement Intelligence Platform (EIP) is a system that facilitates the easy and automatic analysis of conversations for customer interactions. The EIP enables companies and developers to unlock the untapped troves of customer insight, compliance violations, and coaching opportunities that exist in every conversation. The EIP can analyze a large number of conversation transcripts that involve either a particular user or multiple users and provide insights and/or predictions based on the content of the transcript in real time during an ongoing conversation with a current user.

The EIP analyzes transcripts of conversations to find different states and information associated with each of the states (e.g., interest rate quoted in the value of the interest rate). With transition-driven search, instead of searching for a word or a text string, the system enables search parameters associated with the states of the conversation and linkages between the states (e.g., asked if a user smokes, respond as yes, no, maybe).

An annotator User Interface (IU) is provided so the user may perform queries, such as, "Find all calls were the agent asked the customer for their name and the customer did not answer;" "Find all calls where the customer objected after the interest rate for the loan was quoted, "Find me calls where the agent asked for consent for recording the call, but no customer confirmation was received."

EIP analyzes the conversation and labels (e.g., "tags") the text where the conversation associated with the label took place, such as, "An interest rate was provided." The labels are customizable (e.g., based on a configuration file), so each client can define its own labels based on business needs. The UI also enables the user to add, modify, and delete labels. For example, a company requires that agents tell customers that they are on a recorded line. The annotator detects when the agent says her name and labels the interaction.

The annotation interface has two purposes: first, it provides a medium to communicate to the user what the machine learning models predict; and, second, it provides a way for users to provide feedback on the labels. This allows for continuous improvement of the machine-learning (ML) models used to analyze the conversations. The annotator may be used via a provided UI application or the annotator may be embedded in the customer's own application.

Methods, systems, and computer programs are presented for labeling the content of voice conversations. The conversations are translated into text and analysis of the conversation is performed to identify information in the conversation. The information identified includes turns identified from data in the conversation and identified within each state. A user interface (UI) is provided to review the conversations and add annotations that tag the different turns. Additionally, parameter values are extracted from the text. An annotator tool is provided to analyze the conversation and label (e.g. "tag") the words associated with the label.

One general aspect includes a method that includes accessing a transcript including text of a conversation. The method further includes processing the transcript to identify one or more segments within the transcript, each segment comprising one or more words and being associated with one label from a set of labels. This may be done by a machine learning (ML) model where the ML model has been trained with a training set comprising a set of transcripts with annotations associating segments of the transcript with one from the set of labels. A powerful UI presents the transcript with the identified segments and corresponding labels.

FIG. 1 shows an architecture of a communications service provider that provides contact center services, according to some example embodiments. In some example embodiments, a communications service provider 102 provides call-center services to facilitate voice and data communications between devices of customers 118 and agents 114.

The agents 114 may work for a plurality of companies that use the services of the communications service provider 102. The customers 118 may establish video and voice conversations to communicate with the agents 114, such as for requesting support for a product of service.

The customers 118 and agents 114 communicate with the communications service provider 102 via direct connections or through a network 116, such as the Internet or a private network connection.

When a customer 118 requests a video or voice communication with the company, the communications service provider 102 routes the video or voice communications to one of the agents 114 from that company. When an agent 114 initiates the call, the conversation manager 112 routes the call to the customer 118.

During the conversation, a conversation manager 112 records the conversations (e.g., voice data) in a conversations database 110 of the communications service provider 102.

Additionally, the communications service provider 102 includes a video processor 104 that processes video calls, a voice processor 106 that processes voice calls, and a communications router 108 that routes the communication data between customers 118 and agents 114.

The conversation manager 112 manages the conversations, such as to establish, monitor, and terminate conversations, as well as managing the storage of conversation data when requested by the client.

The clients may use the conversation data to manage, monitor, and improve operations, such as to monitor for compliance by an agent or to determine when a follow up call is requested to further a sales process.

The Enterprise Intelligence Platform (EIP) 120 is a program that analyzes spoken and written customer interactions and provides programmable customization tools for customers to tag, edit, analyze, and search the data from the spoken and written customer interactions. In example embodiments, the EIP provides one or more application programming interfaces (APIs) that one or more client systems can use to access one or more functions of the EIP described herein (e.g., from one or more client applications or plug-ins deployed on the one or more client systems).

Figure 2:
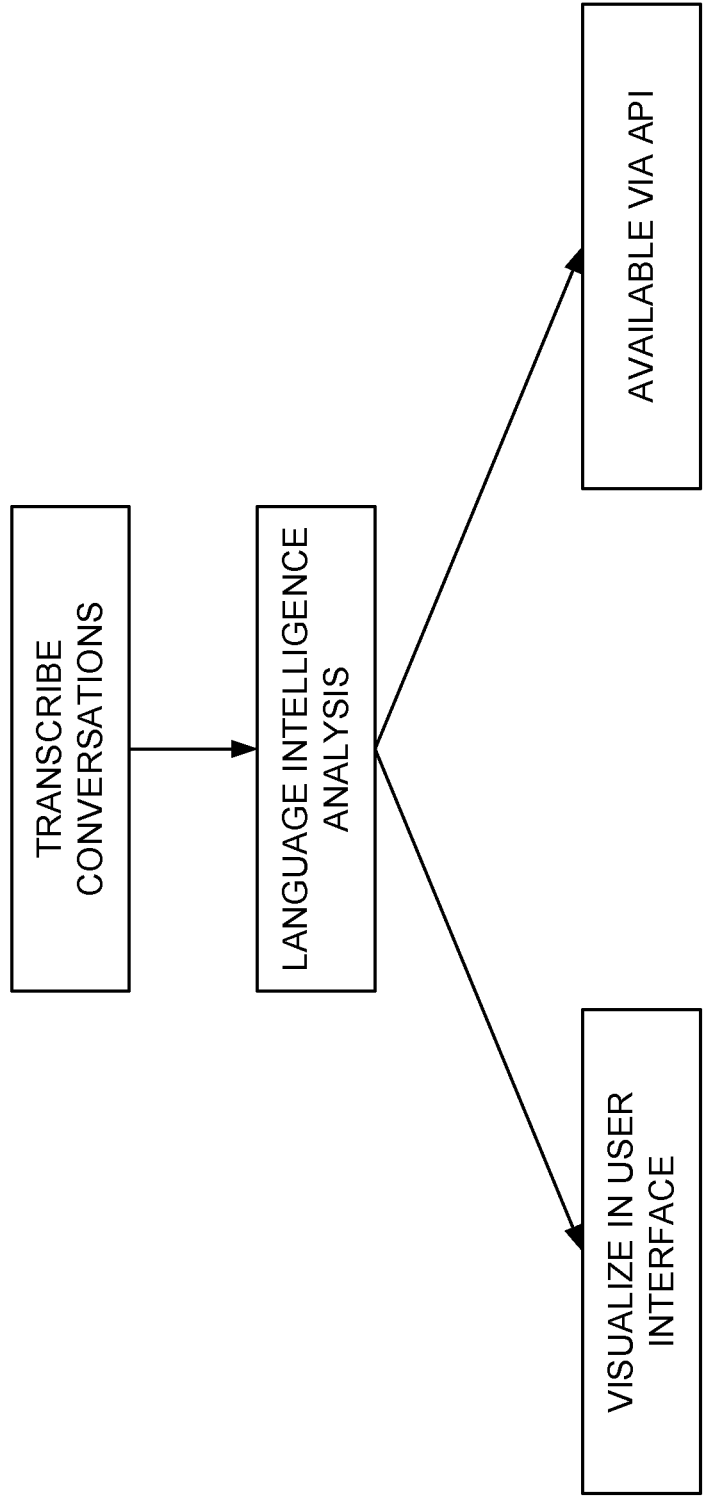
FIG. 2 is a flow diagram showing, at a high level, the conversation tools available for search and review, according to some example embodiments.

FIG. 2 shows, at a high level, the conversation tools available for search and review, according to some example embodiments. The EIP 120 includes tools for transcribing conversations, analyzing language within the conversations, and visualizing the results from the analysis in the user interface. The EIP 120 also provides tools for search, and for accessing the conversation data via an API.

In some example embodiments, the analysis of the conversations includes identifying sections of the conversation associated with a configured event, and each event is associated with a corresponding label, also referred to as tag or annotation. The user may then search by label, add labels, delete labels, etc.

In some example embodiments, the EIP analyzes the conversation data offline; that is, the EIP is not active in trying to guide the conversation, although, in some example embodiments, the EIP may also analyze data in real-time to provide real-time information.

Transition-driven search refers to the ability to search conversation data based on the natural turns in the conversation between the two participants and based on an analysis of the content within each turn and how multiple turns relate to each other, such as when multiple turns refer to the same topic (e.g., agent providing their name to the caller).

By using labels, EIP provides great flexibility for searching through thousands of conversations to find events that would be almost impossible to find through standard text searches, or it would require a large amount of time to scan through all the conversations.

Figure 3:
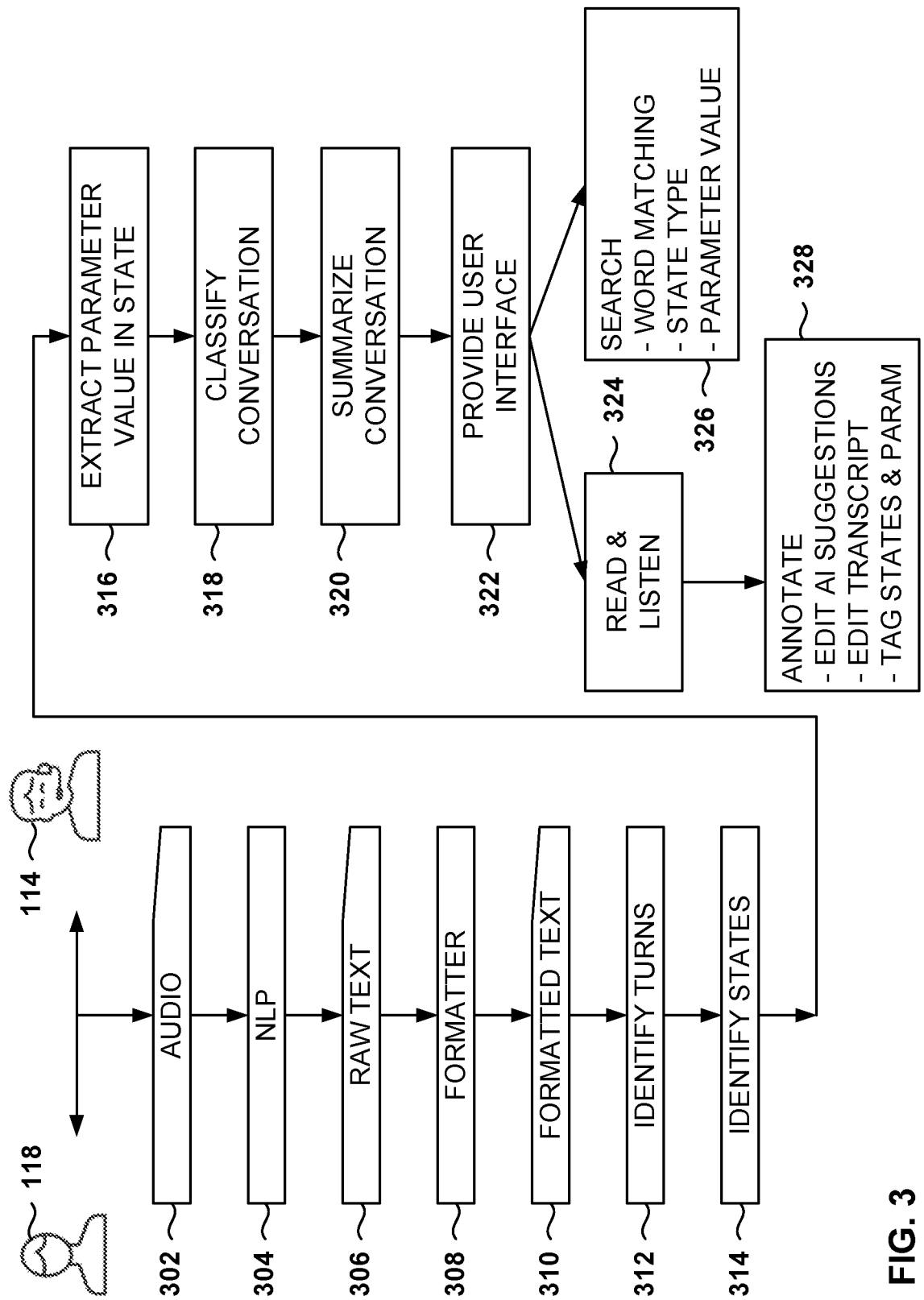
FIG. 3 is a sample flow diagram showing the use of different tools for conversation analysis and review, according to some example embodiments.

FIG. 3 is a sample flow showing the use of different tools for conversation analysis and review, according to some example embodiments. While the various operations in this flowchart are presented and described sequentially, one of ordinary skill will appreciate that some or all of the operations may be executed in a different order, be combined or omitted, or be executed in parallel.

At operation 302, the audio of the conversation is captured, and at operation 304, natural language processing (NLP) is used to analyze the audio of the conversation to generate the raw text 306. The raw text 306 is a list of words identified in the conversation, without including commas, periods, or any other punctuation marks that help identify sentences within the conversation.

The formatter 308 takes the raw text 306 and formats the text into plain English sentences, such as by dividing the raw text 306 into sentences, adding periods and commas, capitalizing beginning of sentences and proper names, etc. The result is that formatted text 310.

After the formatted text 310 is available, the turns in the conversation are identified at operation 312, where each turn represents the words spoken by one of the parties without interruption by the other party.

In some example embodiments, identifying turns (e.g., identifying a question and a corresponding answer) is not a simple proposition because it involves more than just identifying two turns within the conversation. Sometimes, it may take several turns to ask a question and get an answer. For example, there are several types of questions that causes some people to be reluctant to respond, and it might take several turns of reinstating the question to get a clear answer, such as asking if the caller is a smoker.

Further, the exact words used to ask the question may not matter, as long as the question is asked. Therefore, the ML model may have to be able to identify multiple ways of asking the same question as a simple text search may fail.

At operation 314, the EIP identifies states within the conversation, where each state refers to a segment of the conversation associated with a single topic (e.g., providing the name of the party, quoting a price for a good, obtaining contact information, etc.). Each state is associated with a corresponding label. A state may include one or more turns, because a participant may require multiple turns to provide certain information (e.g., one turn providing name as "John," agent asking for full name, customer providing "John Doe").

Further, at operation 316, one or more of the identified states are analyzed to extract a parameter value. For example, for a state where a name is provided, the name is extracted; for a phone-number state, the phone number is extracted; for a quote of an interest rate, the interest rate is extracted; for a state where the client identifies if the client is a smoker, smoker or no smoker is extracted, etc. In some example embodiments, an ML model is used to extract the parameters.

At operation 318, the conversation is classified according to one from a plurality of possible classification values that identify outcomes of the classification. For example, the classification values may include a positive outcome, a neutral outcome, or a negative outcome. In another example, the classification values may include a sale was made or a sale was not made.

At operation 320, a summary of the conversation is created. In some example embodiments, the summary is a textual abstract of the content of the conversation. In some example embodiments, the summary is generated by an ML model.

At operation 322, a user interface is provided to the user, where the user interface includes multiple options for examining conversations, including reading and listening to the conversations 324 and performing searches 326. The user interface provides an option to annotate 328 (e.g., add labels) the conversation, such as to edit the suggested labels generated by the AI models, edit the transcript suggested by the NLP, tag the states, and validate values of identified parameters.

The search 326 may be of different kinds, such as word matching (e.g., word search), search by state type (e.g., whether agent identified herself), or by parameter value (e.g., caller's location of residence is California), or a combination thereof.

FIG. 4 is a UI 400 that includes examples of options for tagging sections of the conversation, according to some example embodiments. The UI 400 is referred to herein as the annotator UI and presents the transcript of the conversation for efficiently listening and reviewing conversations, seeing related annotations, which may be generated by a user or the ML model, and providing the ability to tag the conversation.

Tagging, referred to herein as annotating, includes identifying states or parameters within the conversation, such as a user name, and assigning the state to the corresponding label. In some example embodiments, the user is able to create custom labels, such as labels indicative of an agent name, a statement that the conversation is recorded, a use of profanity, etc. Once the custom labels are created, the user is able to quickly select a piece of text and then associate the selected text with one of the labels. For example, after selecting a piece of text, the user may select from one of the custom labels presented by the UI 400 to associate the label to the selected text. In the illustrated example of FIG. 4, the the word "Brittney" has been associated with the label NameAgent and indicted where the agent provides their name.

In some example embodiments, the complexity of analyzing conversations is greatly reduced by limiting the analysis to identify those labels created by the client. Instead of having to analyze millions of possible labels in an open-ended conversation, the system only has to identify from a plurality of possible labels. This reduction of complexity may be very useful as, for example, conversations in a support center tend to be very similar and deal with a limited set of possible items. Further, the user may also be concerned with certain parameters and not everything that was said. For example, beginning casual conversation talking about the weather may be of little interest for analyzing the content of the conversation.

However, some of the labels may be common for multiple users, or for users within the same industry, and the EIP system provides a dictionary of common labels to let the user select from the dictionary to be able to build up the custom EIP solution.

Further, the annotator UI allows the user to listen to the actual conversation and, as the audio progresses, the text of the conversation is highlighted. Further, some of the words of the conversation may not be clear for the NLP processor, so words with a low confidence score are highlighted (e.g., presented in a different color font) so the user can correct them if necessary.

Figure 5:
FIG. 5 is an image showing how to attack a name embedded in the conversation utilizing a pull-down menu with options for the configured tags, according to some example embodiments.

FIG. 5 shows how to attach a name embedded in the conversation to an annotation utilizing a pull-down menu with options for the configured tags, according to some example embodiments. Annotating an entry is easy using the UI 400. The user selects a piece of text (e.g., one or more words) and then right clicks on the selection. Menu 502 then is presented with a list of the predefined labels.

If the user selects one of the label options, then the selected text is associated with the label. In the illustrated example of FIG. 5, the user has selected the word "Brittney." After the right click, the options are presented, and the user may select the label NameAgent associated with the state where the agent provides their name.

In some example embodiments, an option is provided to add a new label, and the user may associate the selected test with a newly created label. In the illustrated example, the client has the compliance requirement that the agent states that the conversation is on a recorded line.

Another requirement is that the agent states that the agent is licensed. However, sometimes the agents do not say the word "license," such as saying, "I'm a senior agent." This creates problems when performing searches to determine when agents say that they are licensed by the state.

Consistent labeling allows analysis of the data across many scenarios, such as agents in different geographies or using different languages. The consistent labeling may then be used by ML models to analyze the data, generate better training sets, and perform better predictions, including the tagging task.

In some example embodiments, small tasks may be assigned to agents based on their conversations, such as, "Was this conversation tagged properly?" The human feedback is then used to assess the performance of the ML model that tags the conversations.

In some example embodiments, the annotator UI 400 includes the list of tags, and the user can select any of the tags to see where the tag is used in the conversation.

Figure 6:
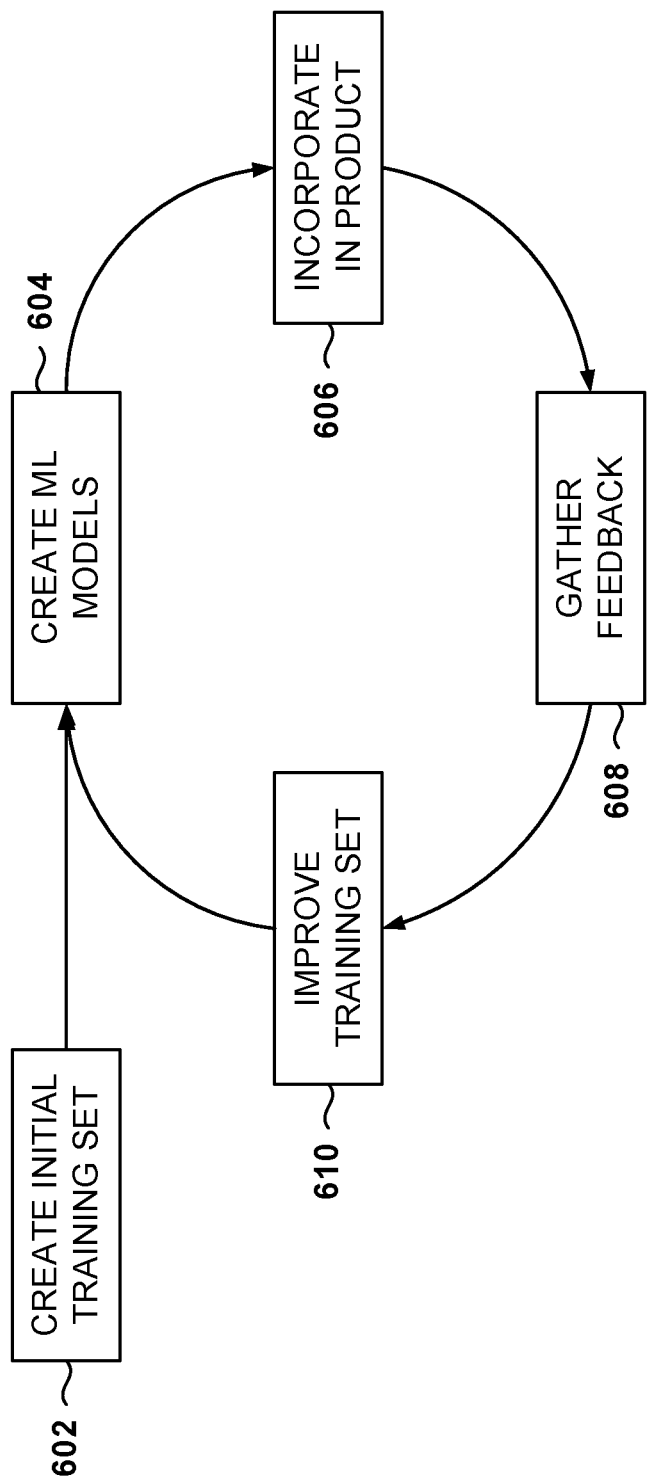
FIG. 6 illustrates the process for creating machine-learning (ML) models and improving the ML models using user feedback, according to some example embodiments.

FIG. 6 illustrates the process for creating machine-learning (ML) models and improving the ML models using user feedback, according to some example embodiments.

ML models use training data that is used by ML algorithms to create the models 604 based on the relationships found among the features within the training set. In some cases, the initial training set is created 602 using manual labels, which are created by human judges that analyze a conversation and provides values to the features, such as "name was provided," "the call was positive overall," "a price was quoted," etc.

However, the process of labeling the data may be expensive, requiring many hours of work label a large number of data points in the training set so the machine-learning models can be effective.

Once the initial training set is available, one or more ML models are created 604 to make predictions for provided inputs. The ML model is then incorporated into a product 606 and used by the users. Over time, feedback is gathered 608 on the accuracy of the ML models. For example, an agent is sent a question saying, "was the sentiment for the conversation correct?" and the agent may confirm or deny.

Further, other data points may be collected, such as when users make edits on the assigned labels to a conversation, such as by deleting labels, adding labels, etc. These corrections from users, together with other data points, are used to improve the training set 610, that is, a new training set is created based on the previously available training set and the data points collected as feedback.

The improved training set is then used to regenerate the ML models, and the data points will improve the accuracy of the ML models over time.

This process for improving the ML models is more efficient than having humans constantly analyze new conversations in order to generate new data labels for new training sets.

Other conversation-viewing tools do not provide the feedback mechanisms embedded within the annotator, which allows the annotator to continuously improve with direct feedback received from the users that best understand the system.

Further, the annotator is customizable per user (e.g., defining user labels). Thus, each customer is able to take advantage of the improvement cycles to customize the data for their own models.

FIG. 7 shows the use of the option for configuring the call sentiment of the conversation, according to some example embodiments. The UI 400 includes an option 702 for the user to categorize the overall conversation. In the illustrated example, the categorization option is referred to as "call sentiment," with the possible values of "positive," "neutral," and "negative."

The user has the option to categorize the whole conversation by selecting one of the values. In some example embodiments, the possible values are configurable by the user. For example, the user is able to specify a list the desired possible categories. In some example embodiments, an ML model analyzes the conversation and provides an initial value for the call sentiment, which may be overridden by the user.

The annotator is customizable per user, and each user is able to develop its own interfaces by configuring the data. Also, each user is able to gather user-specific data to create unique models for analyzing the conversation data.

Figure 8:
FIG. 8 is an image showing the user interface with color-coded tags for easy review, according to some example embodiments.

FIG. 8 shows a UI 800 with color-coded tags for easy review, according to some example embodiments. In UI 800, each annotation is of a different color, as illustrated on the list of annotations provided on the left of the UI 800. The identified annotations are then presented in color within the conversation text, for faster and easier tracking and searching of the annotations.

For example, in certain industries, regulations require that agents identify themselves by first and last name. A label may be created to associate a portion of the conversation with the activity associated with providing the name and assigning a label to the piece of the conversation.

Although each user may have different requirements and create different labels, sample labels may be very common across users, so a library of available labels are provided by the annotator to assist customer that are initializing the system and creating their own labels.

The labels and their locations are stored as an additional layer associated with the text transcript of the conversation, when the additional layer describes the labels and their location within the conversation.

Figure 9:
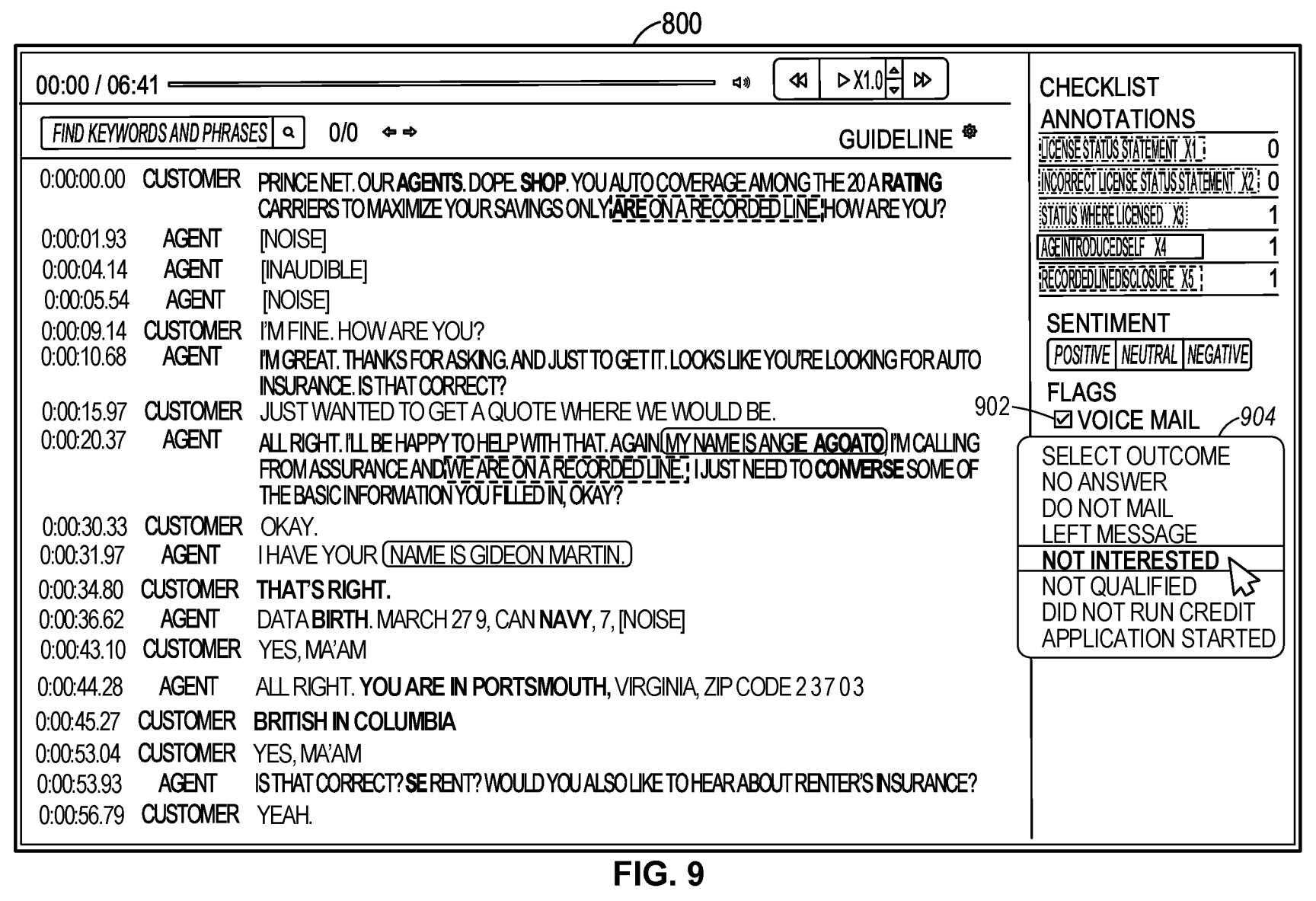

FIG. 9 is an image of the UI 800 showing options associated with providing information about a call to a user, according to some example embodiments. As seen in the transcript, some of the tags have been identified (shown in bold font) in the conversation, e.g., recorded line, name, birthdate, location. In some example embodiments, a voicemail flag 902 is provided to the user to add information regarding a call to the user.

When the user checks the voicemail flag 902, a pop-up menu 904 is presented with predefined options for selecting the outcome of the voicemail. For example, the options may include "no answer," "do not mail," "left message," "not interested," "not qualified," "did not run credit," "application started," etc. In some example embodiments, an additional option (not shown) is provided to enter free text.

FIG. 10 illustrates part of an example configuration for the annotator, according to some example embodiments. The annotator is configurable so adding custom options is easy for users. The configuration may be saved in a file, such as a JSON file, a XTLM file, an HTML file, or other types of files. Further, the configuration may be stored in a computer memory, such as a database.

The example illustrated in FIG. 10 is a configuration saved in a JSON file. The configuration may include a list of labels and other options, such as the call sentiment or the voicemail for describing a board. The example illustrated in FIG. 10 includes the list of options for the voicemail flag of FIG. 9. For each option, the configuration includes the type of the entry, an identifier (ID) of the option, the name of the option, the value, and the label presented on the pop-up menu. The configuration may include different type of HTML UI elements, like pop-up menus, check boxes, free-form fields, etc.

The annotator provides a flexible platform that can be integrated with other tools, provided by the communications service provider or custom user tools.

To add new options, the user edits the JSON file, and the new option is added to the UI without having to reprogram the application.

When the custom options are presented to users, the custom options generate data associated with the conversations. This data may be used as training data for the ML models that can be tailored to each of the users based on their data requirements. For example, an ML model may be created to estimate the call sentiment based on the transcript of the conversation by creating training data that includes transcripts of previous conversations and the values of the call sentiment assigned by the users.

Figure 11:
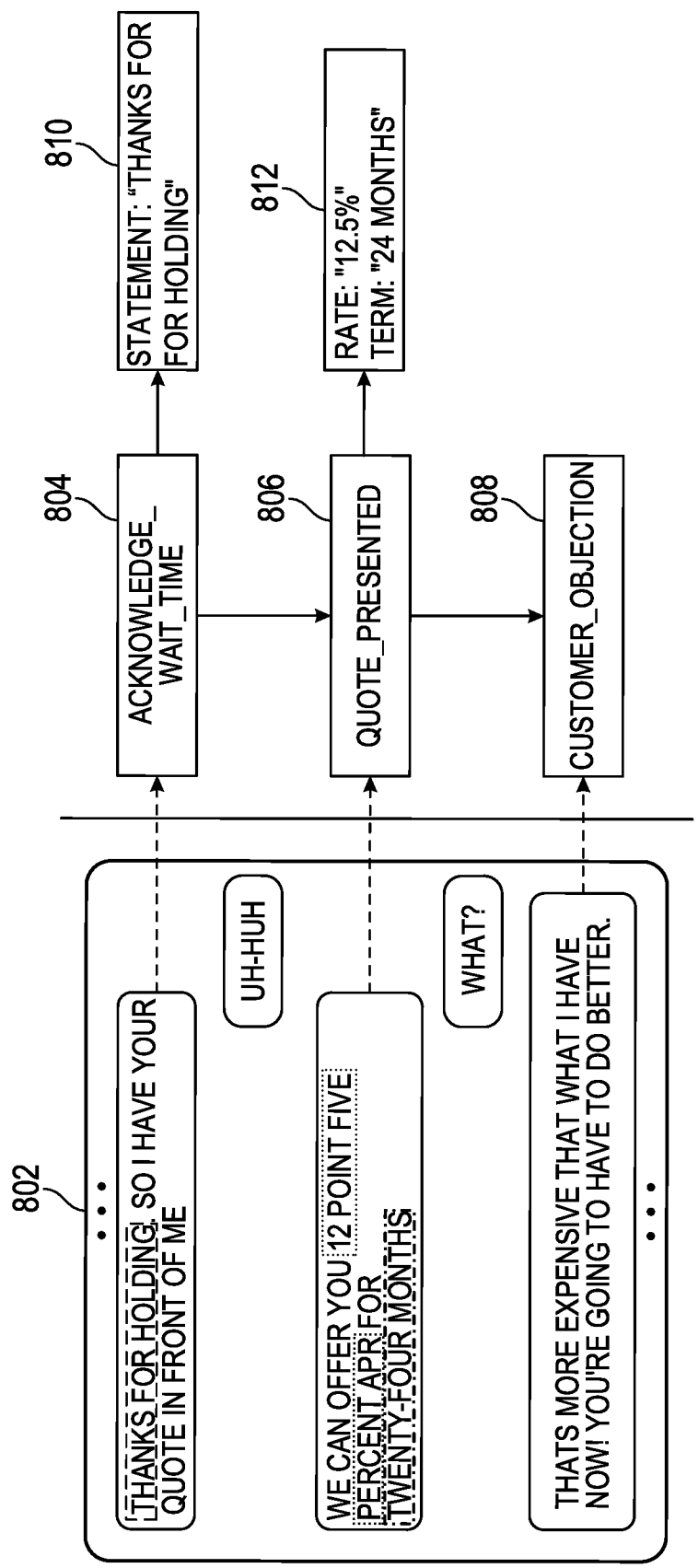
FIG. 11 is a diagram illustrating the detection of states and the extraction of parameter values within the state, according to some example embodiments.

FIG. 11 illustrates the detection of states and the extraction of parameter values within the states, according to some example embodiments. In the illustrated example, a portion of the conversation is presented in window 802.

The first turn in the conversation includes a message, "Thanks for holding, so I have your quote in front of me." This turn is associated with the state 804 ACKNOWL-EDGE_WAIT_TIME for acknowledging the wait time. Further, the parameter 810 value "Thanks for holding" is extracted.

In the next turn, the text includes, "We can offer you 12 point five percent APR for twenty-four months," and the corresponding state 806 is for presenting the quote QUOTE_PRESENTED. Associated with state 806 are the parameter values 812 for rate as 12.5% and for term as 24 months.

The next turn includes the utterance "What," which is not associated with any annotated state. The next line reads, "That's more expensive than what I have now! You're going to have to do better." This line is associated with the state 808 for a customer objection CUSTOMER_OBJECTION.

By identifying the states and extracted parameters, the search within conversations is much easier and provides abilities that would be almost impossible with simple text searching.

In some example embodiments, this process is referred to as the classify-extract flow. A classify-extract flow includes a classify step, where a machine learning model identifies what sentences to analyze, and an extract step, which finds the span or spans of interest within the identified sentences. A benefit of the classify-extract flow as a model framework is that it is generic enough to satisfy a whole realm of desired ML surface areas to turn unstructured utterances into structured and extracted data.

Figure 12:
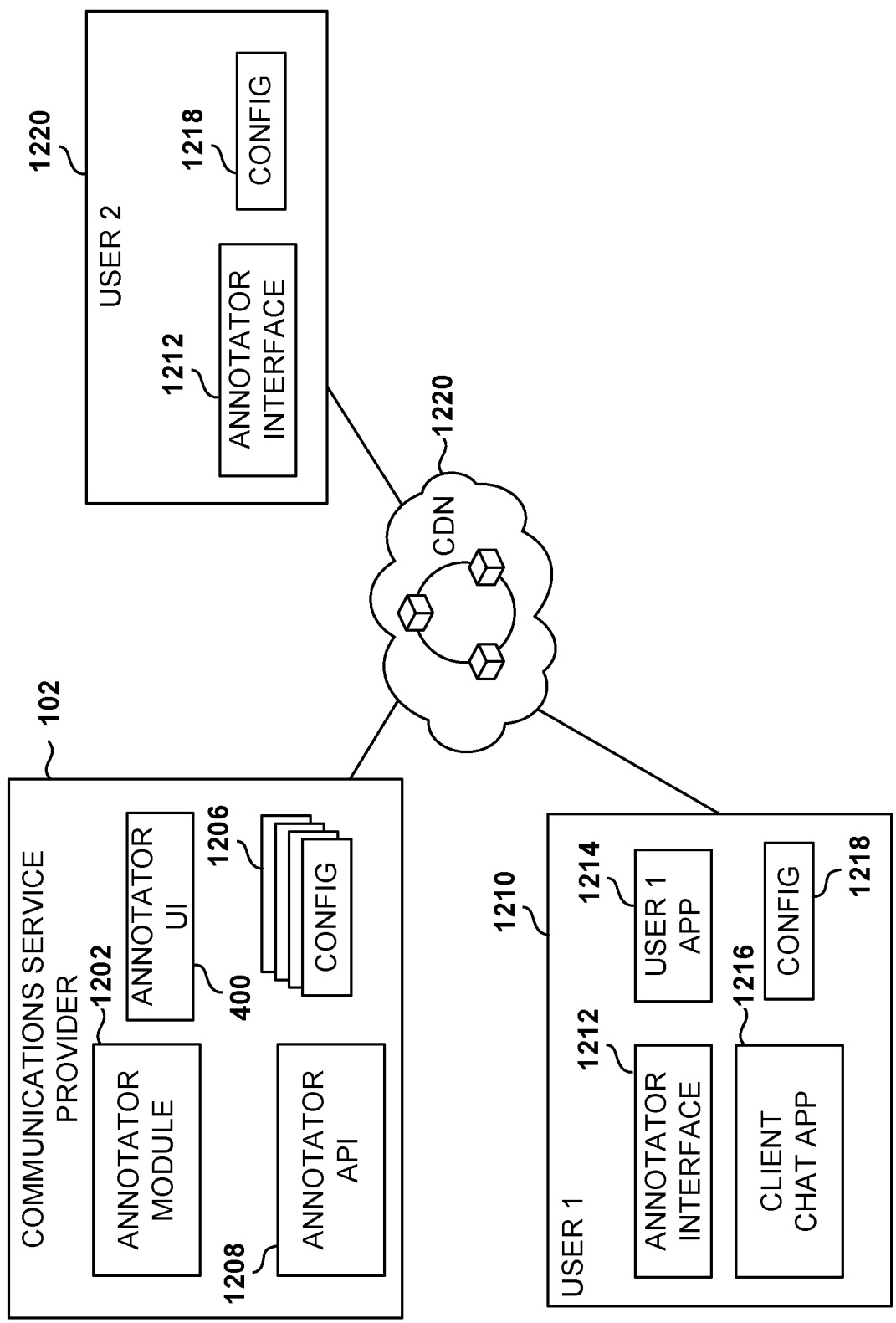
FIG. 12 is a network architecture for the implementation of the annotator feature, according to some example embodiments.

FIG. 12 is a network architecture for the implementation of the annotator feature, according to some example embodiments. The communications service provider 102 includes an annotator module 1202, the annotator UI 400, and annotator API 1208, and configuration files 1206. Additionally, users interact with the communications service provider 102 via a content delivery network (CDN) 1220, which is a geographically distributed group of servers which work together to provide fast delivery of Internet content. The users may have their own programs that integrate with the annotator of the communications service provider 102 (e.g., user 1 1210), or use the annotator features of the communications service provider 102 (e.g., user 1 1220).

The annotator module 1202 is a program that provides annotator features and is be utilized by the annotator API 1208, and the annotator UI 400. The annotator API 1208 provides a programmatic interface to access the data provided by annotator module 1202. Some of the features supported by the annotator API 1208 include activities related to the configuration files 1206 (e.g., read, load), conversation transcripts (e.g., read, load), labels (e.g., add, delete, read within transcript, etc.).

User 1 1210 may access the annotator features utilizing the annotator interface program 1212 provided by the communications service provider, or may use its own client chat application 126, which uses the annotator API 1208 to interact with the annotator module 1202 and integrate the functionality provided by the annotator. In some example embodiments, the annotator interface program 1212 is a plugin, which is a software add-on that is installed on a program, enhancing its capabilities.

Each user has her own configuration file 1206. The configuration files may be stored at the communications service provider 102, at the user site (e.g., configuration file 1218), or at both sites.

Figure 13:
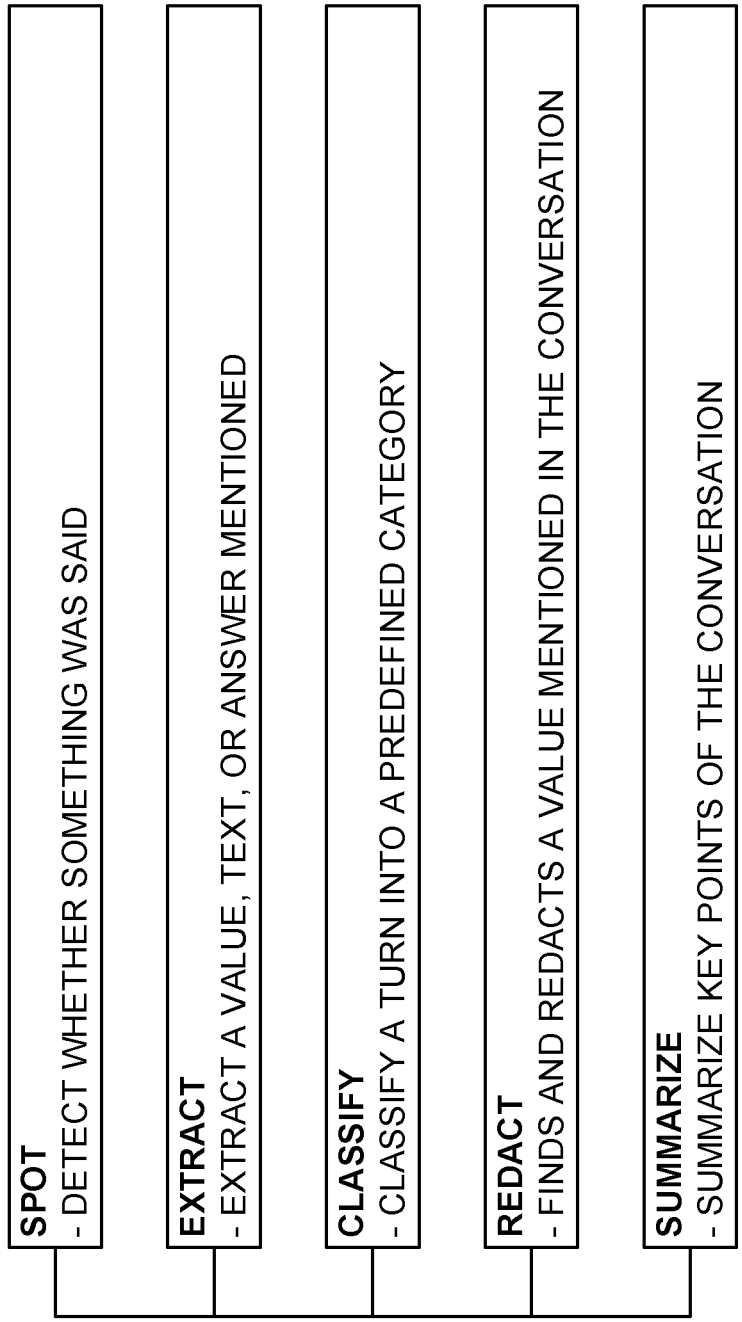
FIG. 13 is a flow chart illustrating five of the primitives used to understand conversations, according to some example embodiments.

FIG. 13 illustrates five of the primitives used to understand conversations, according to some example embodiments. As used herein, primitives refer to programs offering respective functionality with regards to conversation analysis.

In some example embodiments, the primitives include spot, extract, classify, and summarize. The spot primitive detects whether something was said in the conversation, such as finding particular words of interest. The extract primitive extracts information from the conversation, such as a parameter value, one or more words, or the answer to a question.

The classify primitive classifies a conversation to find the turns within the conversation. The redact primitive finds and redacts a parameter value mentioned in the conversation. Further, the summarize primitive provides a summary of the key points from the conversation, such as an abstract of a text document.

The different primitives may be combined to perform the conversation analysis, such as using the classify primitive to find annotations within the conversation and the extract primitive to find parameter values within the identified annotations.

In some example embodiments, multiple machine-learning models may be defined to implement the primitives. For example, one ML model may be used to identify the terms within the conversation, and once a particular annotation is provided (e.g., name stated), a model is used to find the name in the turn.

In some example embodiments, a Q&A primitive is used for finding turns in a conversation that include a question and a corresponding answer. It is noted that it may take multiple turns in the conversation to state a question or to obtain the answer; therefore, the Q&A primitive may look beyond simply observing pairs of turns for questions and answers.

Figure 14:
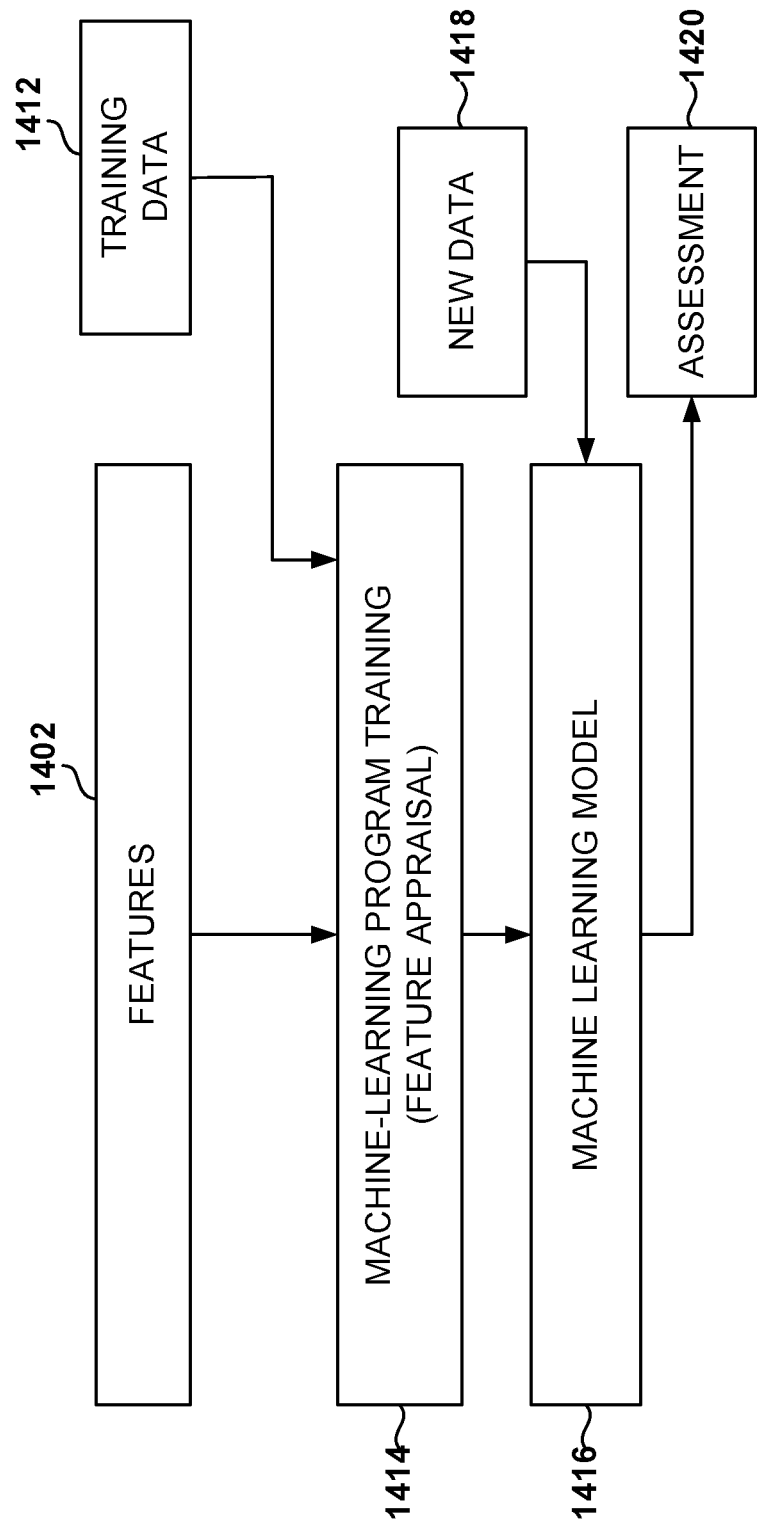
FIG. 14 is a flow chart illustrating the training and use of a machine-learning program, according to some example embodiments.

FIG. 14 illustrates the training and use of a machine-learning program, according to some example embodiments. In some example embodiments, machine-learning programs (MLPs), also referred to as machine-learning algorithms or tools, are utilized to perform operations associated with generation of text summaries for text documents.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 1416 from example training data 1412 in order to make data-driven predictions or decisions expressed as outputs or assessments 1420. Although example embodiments are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Some examples of commonly used supervised-ML algorithms are Logistic Regression (LR), Naive-Bayes, Random Forest (RF), neural networks (NN), deep neural networks (DNN), matrix factorization, and Support Vector Machines (SVM). Some common tasks for unsupervised ML include clustering, representation learning, and density estimation. Some examples of commonly used unsupervised-ML algorithms are K-means clustering, principal component analysis, and autoencoders.

In some embodiments, the ML model 1116 is used to perform analysis of a conversation. For example, the five primitives illustrated in FIG. 13 may be implemented as ML models.

The training data 1412 comprises examples of values for the features 1402. In some example embodiments, the training data comprises labeled data with examples of values for the features 1002 and labels indicating the outcome, such as summaries of conversations, parameters extracted, turns identified, places where a name was found, etc. The machine-learning algorithms utilize the training data 1412 to find correlations among identified features 1402 that affect the outcome. A feature 1402 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs. In one example embodiment, the features 1402 may be of different types and may include words used in the conversations, labels identified in the conversation, call sentiment, voicemail flag, etc.

During training 1414, the ML algorithm analyzes the training data 1412 based on identified features 1402 defined for the training. The result of the training 1414 is an ML model 1416 that is capable of taking inputs to produce assessments. In some example embodiments, the inputs include a transcript of a conversation, and the output is an identified state, a parameter extracted, an annotation in the text, etc.

Training the ML algorithm involves analyzing large amounts of data (e.g., from several gigabytes to a terabyte or more) in order to find data correlations. The ML algorithms utilize the training data 1412 to find correlations among the identified features 1402 that affect the outcome or assessment 1420. In some example embodiments, the training data 1412 includes labeled data, which is known data for one or more identified features 1402 and one or more outcomes, such as the summaries generated.

The ML algorithms usually explore many possible functions and parameters before finding what the ML algorithms identify to be the best correlations within the data; therefore, training may make use of large amounts of computing resources and time.

Figure 15:
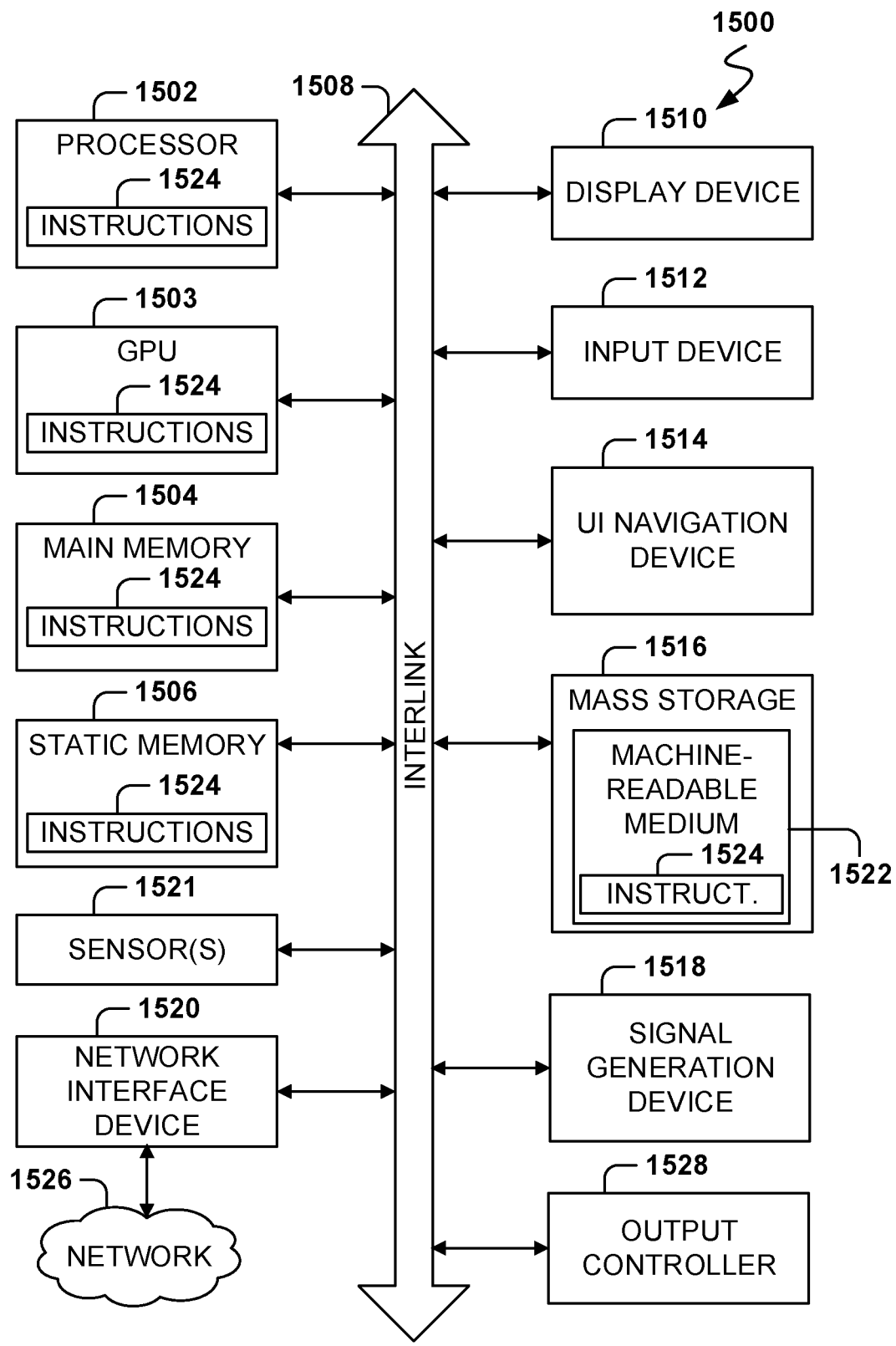
FIG. 15 is a block diagram illustrating an example of a machine upon or by which one or more example process embodiments described herein may be implemented or controlled.

FIG. 15 is a block diagram illustrating an example of a machine 1500 upon or by which one or more example process embodiments described herein may be implemented or controlled. In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in a peer-to-peer (P2P) (or other distributed) network environment. Further, while only a single machine 1500 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1500 may include a hardware processor 1502 (e.g., a central processing unit (CPU), a hardware processor core, or any combination thereof), a graphics processing unit (GPU) 1503, a main memory 1504, and a static memory 1506, some or all of which may communicate with each other via an interlink (e.g., bus) 1508. The machine 1500 may further include a display device 1510, an alphanumeric input device 1512 (e.g., a keyboard), and a user interface (UI) navigation device 1514 (e.g., a mouse). In an example, the display device 1510, alphanumeric input device 1512, and UI navigation device 1514 may be a touch screen display. The machine 1500 may additionally include a mass storage device (e.g., drive unit) 1516, a signal generation device 1518 (e.g., a speaker), a network interface device 1520, and one or more sensors 1521, such as a Global Positioning System (GPS) sensor, compass, accelerometer, or another sensor. The machine 1500 may include an output controller 1528, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1516 may include a machine-readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within the static memory 1506, within the hardware processor 1502, or within the GPU 1503 during execution thereof by the machine 1500. In an example, one or any combination of the hardware processor 1502, the GPU 1503, the main memory 1504, the static memory 1506, or the mass storage device 1516 may constitute machine-readable media.

While the machine-readable medium 1522 is illustrated as a single medium, the term "machine-readable medium" may include a single medium, or multiple media, (e.g., a centralized or distributed database, and/or associated caches and servers) configured to store the one or more instructions 1524.

The term "machine-readable medium" may include any medium that is capable of storing, encoding, or carrying instructions 1524 for execution by the machine 1500 and that cause the machine 1500 to perform any one or more of the techniques of the present disclosure, or that is capable of storing, encoding, or carrying data structures used by or associated with such instructions 1524. Non-limiting machine-readable medium examples may include solid-state memories, and optical and magnetic media. In an example, a massed machine-readable medium comprises a machine-readable medium 1522 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1524 may further be transmitted or received over a communications network 1526 using a transmission medium via the network interface device 1520.

Figure 16:
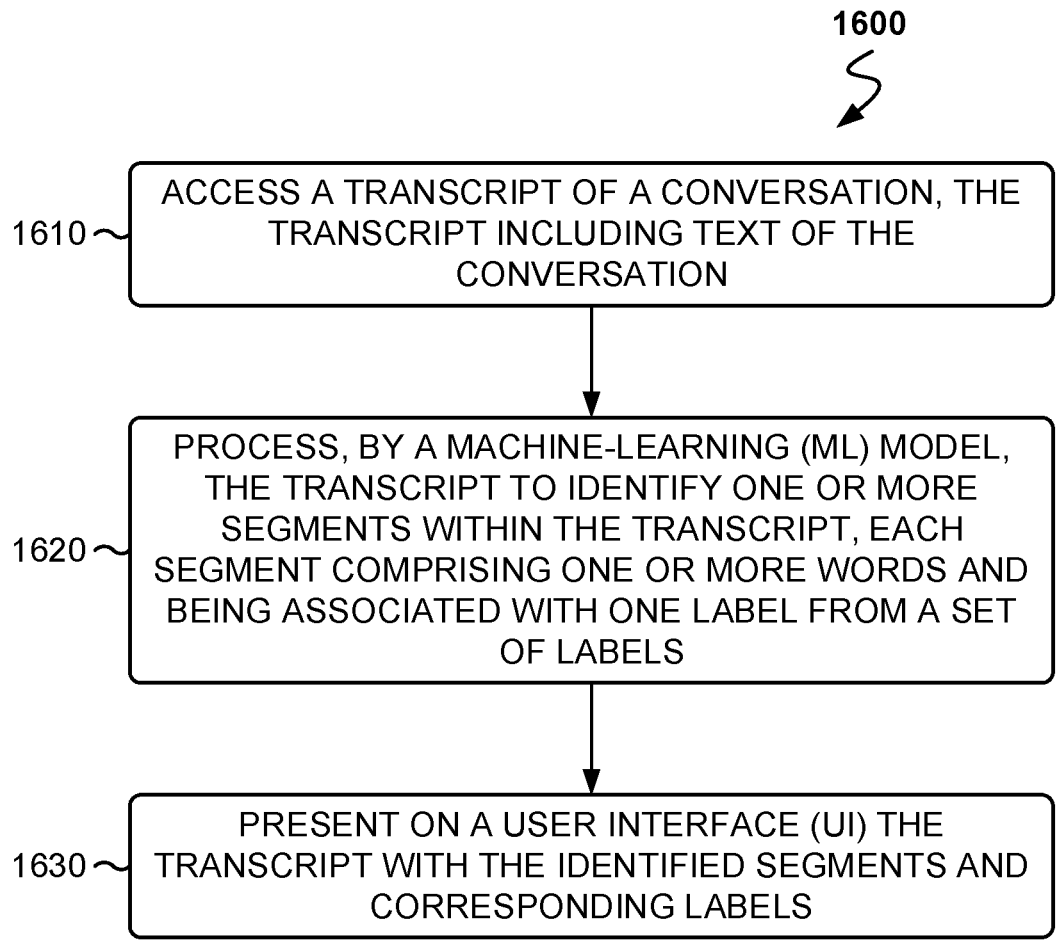
FIG. 16 is a flowchart of a method for using the annotator to annotate and review audio conversations, according to some example embodiments.

FIG. 16 is a flowchart of a method 1200 for using the annotator to annotate and review audio conversations, according to some example embodiments. In example embodiments, the operations of method 1200 are performed by the communications service provider 102 (e.g., in response to a call of an API provided by the communications service provider 102 to one or more client systems). While the various operations in this flowchart are presented and described sequentially, on of ordinary skill will appreciate that some or all of the operations may be executed in a different order, be combined or omitted, or be executed in parallel.

At operation 1610 a transcript of a conversation is accessed, the transcript including text of the conversation. Each transcript comprises transcript data, and the transcript data comprises transcript text and one or more identified states within the transcript. Each state is associated with a state tag, a location within the transcript text, and a state parameter extracted from the transcript.

At operation 1620, the transcript is processed (e.g., by a machine-learning (ML) model), to identify one or more segments within the transcript, each segment comprising one or more words and being associated with one label from a set of labels. The ML model has been trained with a training set comprising a set of transcripts with annotations associating segments of the transcript with one from the set of labels.

At operation 1630 a user interface (UI) the transcript with the identified segments and corresponding labels is generated and communicated (e.g., for presentation on a client device). The UI includes options for selecting and annotating labels in association with a text from the transcript.

In one example, features of the ML model comprise turns identified in the conversation, names, location of the names in the transcript, value of parameters in the conversation, and a call sentiment for the conversation.

In one example, each configuration file is associated with a user.

In one example, the method 1600 further comprises detecting in the UI a selection of one or more words of text within the transcript, and, in response to detecting the selection, presenting in the UI the set of labels for association with the selected one or more words.

In one example, the method of 1600 further comprises presenting, in a window of the UI, the set of labels with a counter of how many times each label is identified in the transcript.

In one example, a first label from the set of labels is associated with a parameter, where the ML model identifies a value of the parameter within the transcript.

In one example, the method 1600 further comprises accessing a configuration file with a definition for the set of labels.

In one example, a first label is for an interest-rate quote being presented in the conversation, and a value of the interest-rate quote is extracted from the transcript and associated with the first label.

In one example, the method 1600 further comprises presenting in the UI an option to set a value for an outcome of the conversation, the value being selected from one of no answer, left message, not interested, or application started.

In one example, the method of 1600 further comprises presenting in the UI an option to set a value for a sentiment of the conversation, the value being selected from one of positive, negative, or neutral.

Another general aspect is for a system that includes a memory comprising instructions and one or more computer processors. The instructions, when executed by the one or more computer processors, cause the one or more computer processors to perform operations comprising: access, by one or more processors, a transcript of a conversation, the transcript including text of the conversation, process, by machine-learning (ML) model, the transcript to identify one or more segments within the transcript, each segment comprising one or more words and being associated with one label from a set of labels, wherein the ML model has been trained with a training set comprising a set of transcripts with annotations associating segments of the transcript with one from the set of labels, and present on a user interface (UI) the transcript with the identified segments and corresponding labels.

In yet another general aspect, a machine-readable storage medium (e.g., a non-transitory storage medium) includes instructions that, when executed by a machine, cause the machine to perform operations comprising: access, by one or more processors, a transcript of a conversation, the transcript including text of the conversation, process, by a machine-learning (ML) model, the transcript to identify one or more segments within the transcript, each segment comprising one or more words and being associated with one label from a set of labels, wherein the ML model has been trained with a training set comprising a set of transcripts with annotations associating segments of the transcript with one from the set of labels, and present on a user interface (UI) the transcript with the identified segments and corresponding labels.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   accessing, by one or more processors, a transcript of a conversation held in turns between a first party and a second party;
   identifying, by the one or more processors, a portion of the transcript of the conversation, the identified portion including multiple pairs of turns that all correspond to a common topic within the conversation between the first and second parties; and
   generating, by the one or more processors, a user interface (UI) that presents the identified portion with a corresponding label indicative of the common topic within the conversation between the first and second parties.

2. The method of claim 1, further comprising:
   labelling the identified portion of the transcript of the conversation with the label that indicates the common topic.

3. The method of claim 2, wherein:
   the labelling of the identified portion of the transcript of the conversation includes selecting the label indicative of the common topic from a set of labels specified by a configuration file of a user.

4. The method of claim 1, further comprising:
   training a machine-learning model based on training data to identify labels for pairs of turns, each label among the labels indicating a topic of a corresponding pair of turns among the pairs of turns; and wherein:
   the identifying of the portion of the transcript of the conversation includes inputting the transcript of the conversation into the trained machine-learning model, an output of the trained machine-learning model identifying the portion that includes the multiple pairs of turns that all correspond to the common topic.

5. The method of claim 1, further comprising:
   providing the generated UI to a client device configured to present the generated UI that presents the identified portion with the corresponding label indicative of the common topic.

6. The method of claim 1, wherein:
   the generating of the UI generates the UI to further present a counter that indicates how many times the common topic appears labeled in the transcript of the conversation.

7. The method of claim 1, wherein:
   the transcript of the conversation is a conversation transcript;
   the identifying of the portion identifies a conversation portion of the conversation transcript;
   the label indicative of the common topic is an output label indicative of the common topic;
   training data on which basis a machine-learning model is trained includes training transcripts that each include training portions that correspond to training labels indicative of training topics; and
   the identifying of the conversation portion includes identifying the output label indicative of the common topic in output of the trained machine-learning model.

8. A system comprising:
   one or more processors; and
   a memory storing instructions that, when executed by the one or more processors, cause the system to perform operations comprising:

accessing a transcript of a conversation held in turns between a first party and a second party;

identifying a portion of the transcript of the conversation, the identified portion including multiple pairs of turns that all correspond to a common topic within the conversation between the first and second parties; and generating a user interface (UI) that presents the identified portion with a corresponding label indicative of the common topic within the conversation between the first and second parties.

9. The system of claim 8, wherein the operations further comprise:

labelling the identified portion of the transcript of the conversation with the label that indicates the common topic.

10. The system of claim 9, wherein:

the labelling of the identified portion of the transcript of the conversation includes selecting the label indicative of the common topic from a set of labels specified by a configuration file of a user.

11. The system of claim 8, wherein the operations further comprise:

training a machine-learning model based on training data to identify labels for pairs of turns, each label among the labels indicating a topic of a corresponding pair of turns among the pairs of turns; and wherein:

the identifying of the portion of the transcript of the conversation includes inputting the transcript of the conversation into the trained machine-learning model, an output of the trained machine-learning model identifying the portion that includes the multiple pairs of turns that all correspond to the common topic.

12. The system of claim 8, wherein the operations further comprise:

providing the generated UI to a client device configured to present the generated UI that presents the identified portion with the corresponding label indicative of the common topic.

13. The system of claim 8, wherein:

the generated UI further presents a counter that indicates how many times the common topic appears labeled in the transcript of the conversation.

14. The system of claim 8, wherein:

the transcript of the conversation is a conversation transcript;

the identifying of the portion identifies a conversation portion of the conversation transcript;

the label indicative of the common topic is an output label indicative of the common topic;

training data on which basis a machine-learning model is trained includes training transcripts that each include training portions that correspond to training labels indicative of training topics; and the identifying of the conversation portion includes identifying the output label indicative of the common topic in output of the trained machine-learning model.

15. A non-transitory computer-readable medium comprising instructions that, when executed by one or more processors of a computing device, cause the computing device to perform operations comprising:

accessing a transcript of a conversation held in turns between a first party and a second party;

identifying a portion of the transcript of the conversation, the identified portion including multiple pairs of turns that all correspond to a common topic within the conversation between the first and second parties; and generating a user interface (UI) that presents the identified portion with a corresponding label indicative of the common topic within the conversation between the first and second parties.

16. The non-transitory computer-readable medium of claim 15, wherein the operations further comprise:

labelling the identified portion of the transcript of the conversation with the label that indicates the common topic.

17. The non-transitory computer-readable medium of claim 16, wherein:

the labelling of the identified portion of the transcript of the conversation includes selecting the label indicative of the common topic from a set of labels specified by a configuration file of a user.

18. The non-transitory computer-readable medium of claim 15, wherein the operations further comprise:

training a machine-learning model based on training data to identify labels for pairs of turns, each label among the labels indicating a topic of a corresponding pair of turns among the pairs of turns; and wherein:

the identifying of the portion of the transcript of the conversation includes inputting the transcript of the conversation into the trained machine-learning model, an output of the trained machine-learning model identifying the portion that includes the multiple pairs of turns that all correspond to the common topic.

19. The non-transitory computer-readable medium of claim 15, wherein the operations further comprise:

providing the generated UI to a client device configured to present the generated UI that presents the identified portion with the corresponding label indicative of the common topic.

20. The non-transitory computer-readable medium of claim 15, wherein:

the generated UI further presents a counter that indicates how many times the common topic appears labeled in the transcript of the conversation.

* * * * *